May 13, 1969           L. J. MONTY           3,443,622

MULTI-ZONE PROCESSING APPARATUS

Filed April 2, 1968

INVENTOR
LEO J. MONTY
BY
Crowley, Kiely & Stevens
ATTORNEYS

United States Patent Office 3,443,622
Patented May 13, 1969

3,443,622
MULTI-ZONE PROCESSING APPARATUS
Leo J. Monty, Reading, Mass., assignor to Artisan Industries, Inc., Waltham, Mass., a corporation of Massachusetts
Continuation-in-part of application Ser. No. 573,981, Aug. 22, 1966. This application Apr. 2, 1968, Ser. No. 718,084
Int. Cl. B01d 1/22, 3/08
U.S. Cl. 159—6       8 Claims

ABSTRACT OF THE DISCLOSURE

A horizontally axised thin-film evaporator for countercurrent operation which includes a vapor chamber adjacent to and upstream of the processing chamber. The wall between the vapor chamber and the processing chamber has a vapor stream passage. Secured about the passage is a flanged sleeve which extends outwardly from the wall into the processing chamber. The sleeve has a ring at the downstream end and prevents liquid material from being entrained in the vapor stream.

---

This is a continuation-in-part of my copending application Ser. No. 573,981, filed Aug. 22, 1966.

Background of the invention

The process industries are constantly confronted with a variety of problems in processing fluid materials. Most fluid materials require undergoing some type of change, for example devolatilization or separation from an initial environment before they are suitable for further processing and future uses. Particularly, such a change is required when processing synthetic polymeric material that contains residual monomeric components, volatile reaction products, solvents and the like. The presence of extraneous materials with polymeric materials may adversely affect subsequent processing operations and properties of the ultimate products. A processing method used is that of agitating the fluid materials in heat exchange process whereby the agitation effects the removal of volatile components. Such a method which has been employed is based on thin-film technology wherein the fluid material is distributed as a thin layer over a heat exchange surface and caused to move along the surface. Although this method and the apparatus derived therefrom has been successful in obtaining devolatilization of fluid materials having viscosities below about 100,000 centipoise at operating conditions, it is not always successful when processing fluid materials having viscosities which exceed about 100,000 centipoise at operating conditions because the material when devolatilized is not readily movable or mechanically processable by existing equipment. However, two methods have been disclosed to overcome this problem where immediate processing in two or more steps is not always needed. (See for example, U.S. Patents Nos. 3,357,-479 and 3,357,478.)

As described in my copending application (herein incorporated by reference in its entirety) in the processing, treating or handling of organic resins or polymers it is often desirable to remove a solvent or liquid material from a resin, solution, emulsion, slurry, suspension or mixture having a different viscosity for example, lower than the original solvent-resin feed to the thin-film evaporator. Prior to my invention as described in my copending application the removal of the solvent and the addition of a liquid or another fluid to the viscous material, required the removal from a first processing stage or thin-film evaporator and then the reintroduction of the viscous material into a second thin-film evaporator or mixer and then the addition of the new or different solvents. The transfer of the viscous material from one stage to another was difficult and costly in that it created considerable material handling problems. My invention is an improvement of the apparatus described in more detail in my copending application. Briefly, a multi-zone thin-film evaporator is described in which there is a first thin-film zone, in which the solvent of a material is removed from the resin. The viscous material is then transferred to a tapered flighted drum axially positioned between a first and second thin-film zone to transfer the viscous material from the first to the second zone and form a vapor seal between the two zones. The viscous material moves into the second zone where an additional solvent or other fluid is then added to the viscous material to get the resultant desired end product. This process is accomplished in one continuous operation. However, it was found in the operation of the multi-zone unit which is typically a countercurrent flow operation, that is, the vapor generated flows countercurrent to the direction of the flow of material being processed through the thin-film unit. It has been observed that this countercurrent vapor flow results in the entrainment of some of the feed material in the vapor stream. Then the entrained feed material is carried out from the first thin-film zone and into the vapor chamber. Accordingly, after operation for a period of time a pool of liquid feed material accumulates in the bottom of the vapor chamber. This is obviously undesirable in that it reduces operating efficiency, requires periodic draining of the vapor chamber and causes loss of feed material.

This type of difficulty has also been encountered in countercurrent operations of single zone thin-film equipment. That is the problem of entrainment of the feed material in the vapor flow path has been recognized and attempts have been made to solve the same. See for example, U.S. Patent No. 3,253,643, wherein a cylindrical projection extends from a diaphragm secured to the chamber wall. The diaphragm is located between the vapor chamber and the processing chamber. However, this device has not proven wholly satisfactory. Accordingly, there still exists a need to eliminate effectively the problem of entrainment of feed material in the vapor stream in a thin-film processing apparatus having countercurrent flow.

Summary of the invention

My invention comprises an improvement over the devices of U.S. Patent No. 3,253,643 and in particular over the apparatus described in my copending application. The invention described in my copending application comprises in combination a closed chamber having an interior wall, a rotor within and extending through the chamber and means to rotate the rotor. The closed chamber is divided into an evaporation zone, a transfer zone, and a feed zone. The zones are axially aligned with the transfer zone being between evaporation and feed zones whereby material produced by the evaporation zone may readily and efficiently be transferred through the transfer zone and into the feed zone. In the evaporation and feed zones there are generally radially extending, axially arranged rotor blades on the rotor extending from the rotor axis into a close thin-film association with the interior wall of the chamber so as to leave a small generally uniform space between the rotor blade tips and the interior wall of the chamber. The evaporation zone is characterized by a feed inlet for the introduction of a feed material. A vapor chamber is adjacent the feed end of the evaporation zone and has a vapor outlet for the removal of vapor material. The feed zone contains a feed inlet for the introduction of a fluid material such as a liquid-gas catalyst, solvent, etc., into the feed zone and a product outlet for the removal of treated material from the feed zone.

The transfer zone contains a tapered or frusto-conical drum secured to the rotor which has helical flights or blades extending circumferentially around the surface with the flights so inclined to transfer material from one to the other end of the drum upon rotation. The taper of the drum and the depth of the flights are so arranged as to provide a vapor seal when the viscous material is transferred from the evaporation zone into the feed zone.

In those countercurrent, horizontally axised, thin-film evaporators, the vapor stream entrains at least some of the feed material being introduced into the thin-film zone and carries it out of the thin-film zone and into the vapor chamber wherein the liquid feed material so entrained is either carried out with the vapor material or precipitates out while in the vapor chamber and forms a liquid pool at the bottom of said chamber. It has been suggested that to overcome this problem that a cylindrical sleeve extending toward the downstream side of the thin-film processing section from a diaphragm be inserted between the vapor chamber and the thin-film processing section. This provides a dam so that the liquid feed material being injected into the thin-film area and cast back against the diaphragm would be directed around the sleeve and then to the bottom of the thin-film section. However, it has been found that the feed material tends to accumulate on the sleeve and flow off the upstream end thereof and into the vapor stream.

My improvement prevents or inhibits the entrainment of feed material in the vapor stream flowing into the vapor chamber. The wall between the vapor chamber and the evaporation zone is characterized by having an opening therein for the passage of the vapors therethrough from the evaporation zone into the vapor chamber. Secured to this wall and circumferentially surrounding the opening therein is a cylindrical projection or sleeve which is flanged by adding a ring at the downstream end thereof. The sleeve preferably extends into the rotor blade area and the blades in evaporation zone are characterized by cut-out segments in the upstream end thereof to accommodate the sleeve. However, if desired, the sleeve may extend up to the ends of the rotor blades.

My invention therefore, avoids the running off of the feed material from the end of the sleeve into the vapor stream. The feed materials which accumulate on the sleeve are directed back toward the wall between the vapor chamber and the evaporation zone and then down to the bottom of the evaporation zone. The flange on the downstream end of the sleeve prevents or inhibits the feed material from dropping off the end of the sleeve and into the vapor stream.

*Description of the preferred embodiments*

Figure 1:
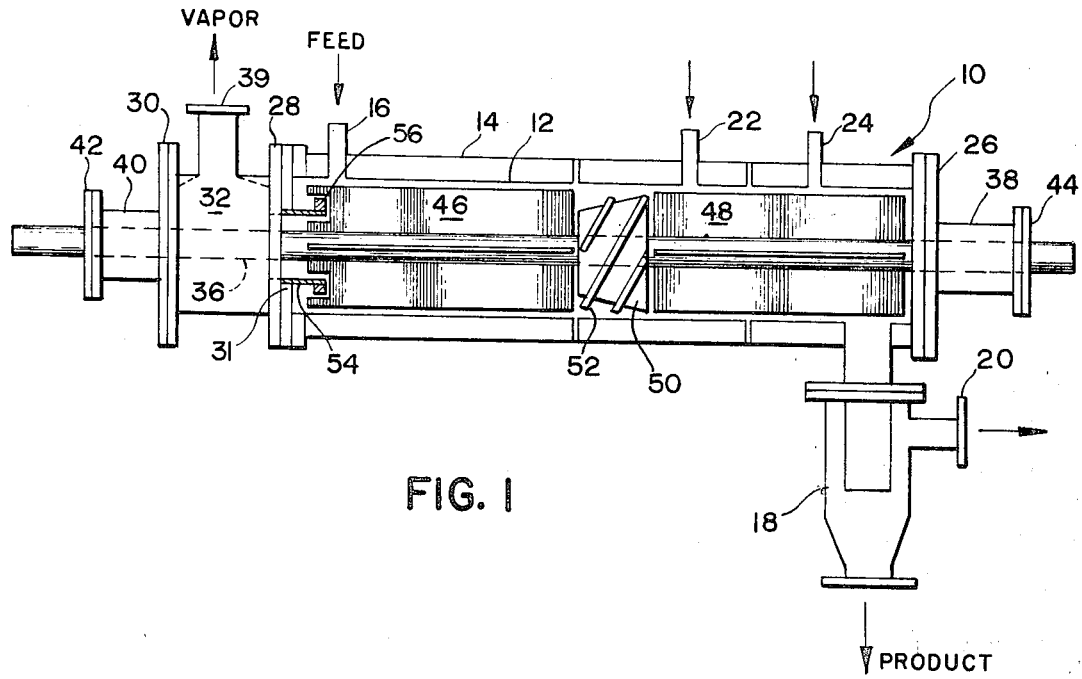
FIG. 1 is a cross-sectional illustration of my invention embodied in a multi-zone thin-film unit.

My invention will be described in connection with a horizontally axised generally cylindrical multi-zone thin-film processing apparatus wherein a solvent is removed from a resin solution in the evaporation zone, the viscous resin transferred to the feed zone and a new or different material added to the dissolventized resin. In FIG. 1 is shown a horizontal axised evaporator shown generally at 10 which comprises a closed, elongated, cylindrical chamber 12 having interior walls and surrounded to a greater part of its length by a temperature control jacket 14 adapted for the introduction of a heat exchange fluid such as steam, cold water or the like. The closed chamber 12 is characterized by a feed inlet 16 at the one end, a product outlet 18 at the opposite end thereof together with a vapor outlet 20 and solvent feed inlets 22 and 24. Closing heads 26 and 30 are secured to either end of the chamber 12 and support a horizontally inclined central axised, tube-like rotor 36 which extends from the one to the other end of the chamber 12 and the vapor chamber 32. The rotor 36 is driven by a motor or other means (not shown), and generally extends outwardly from each end of closing heads 26 and 30. The rotor 36 extends through suitable bearings 38 and 40 and fluid seals or packings 42 and 44. An orifice plate 31 with closing head 28 at the feed inlet end of chamber 12 provides a vapor chamber 32 with vapor outlet 39 for the removal of vapor. The orifice plate 31 has an opening therein generally less than the diameter of the chamber 12 so as to prevent the flow of liquid material into chamber 32. Secured to the orifice plate 31 and about the opening thereof, is a flanged sleeve 54 which extends from the orifice plate and into the thin-film rotor blade section. A ring 56 is secured to the sleeve as shown in FIG. 1.

Extending radially outward from the rotor shaft 36 are a series of radially extending rotor blades 46 and 48, the tips of which extend into a small, generally uniform, closely spaced relationship with respect to the interior wall of the chamber 12, so that upon rotation of the rotor shaft 36, the rotor blades provide a thin-film of material on the interior wall of the chamber 12. The area within the chamber 12 defined by the rotor blades 46 is the evaporation zone, while the area defined by the rotor blades 48 represents the feed zone. The rotor blades 46 are characterized by having openings therein to accommodate the sleeve 54.

Intermediate these areas is a material transfer zone which extends adjacent the product end of the rotor blades 46 to the beginning of rotor blade 48. Secured to the rotor 36 in the transfer zone and mounted for movement therewith is a frusto-conical or tapered drum or spool piece 50. The drum 50 has a series of helical flights 52, typically the number of helical flights may be similar to the number of rotor blades used. The flights 52 have an outside diameter the same or substantially the same as the rotor blades 46 and 48, so that the helical flights extend into a small, but generally uniform, closely spaced, similar relationship with respect to the interior wall of the chamber 12. The flights 52 as shown are spaced uniformly along the surface of drum 50 with the flights extending generally perpendicular to the surface, but inclined at an acute angle to the axis of the rotor, and formed so as to move material from the small diameter drum inlet end of the transfer zone to the large diameter discharge drum end of the transfer zone.

In operation a liquid resin feed material such as a vinyl acetate resin and its hydrolysis products like an organic solvent solution of a polyvinyl acetate is introduced into feed inlet 16 wherein it is thrown against the heated interior wall of the closed chamber 12 by the rotation of the rotor blades 46 to form in the evaporation zone a wiped turbulent thin-film of material on the walls. The volatile component of the feed mixture i.e. the solvent is vaporized and flows from the evaporation zone through the orifice plate 31 into the vapor chamber 32 and out the vapor outlet 34. The feed material is processed from the upstream side of the rotor blade 46 to the transfer zone. The flow of the vapor stream is countercurrent to the flow of the feed material being processed.

Generally a small portion of the feed material is not placed into a thin-film condition on the interior wall of the chamber, but rather it is thrown against the orifice plate 31. The liquid material that strikes the orifice plate then travels downwardly toward the bottom of the evaporator. When the material strikes the sleeve 54 it flows in all directions. The portion of the material which flows toward the downstream end of the sleeve encounters the ring 56 and is prevented or inhibited from falling off the end of the sleeve and being entrained in the countercurrent flow of the vapor stream. If the sleeve were not flanged some of the material striking the sleeve would drop off the downstream side and continually fall into the vapor stream rather than be directed back toward the orifice plate 31.

As the material is processed through the evaporation zone, the volatile component such as the solvent, will be continually removed and the feed material will generally increase in viscosity. The viscous resin product will be discharged from the evaporation zone into the transfer zone, wherein the rotation of drum 50 with the flights 52 will pick up the viscous resin material discharged at the end of rotor blades 46. The viscous material so discharged will fill in the space between the surface of drum 50 and the interior wall of the chamber 12 in the transfer zone and due to the change in flight depth of flights 52, the flights will compress the flow of resin material as it moves from the inlet to the discharge end of the transfer zone. The flights 52 move the material from the evaporating zone to the feed zone by virtue of the tapered drum and flight depths and form a tight liquid seal of the material at the discharge end of the transfer zone. The flights 52 should generally have at least one and one-half turns in the length of the drum 50.

The viscous liquid resin discharged from the transfer zone will be efficiently transferred as a thin-film directly into the feed zone which has rotor blades 48 and which feed zone is similar to the evaporation zone. However, in the feed zone solvent, feed inlets 22 and 24 are used to introduce a new solvent or fluid material into the thin film viscous material in the feed zone, so as to form a new solution, emulsion, suspension or mixture, generally having a lower viscosity than the dissolventized feed from the transfer zone. For example, the addition of an acid solution to form polyvinyl alcohol. The new solvent solution so formed is withdrawn through outlet 18, while any solvent vapors present are withdrawn through vapor outlet 20 to a condensing or recovery system (not shown). The introduction of the solvent into a thin-film, rotary type feed zone permits any solvent or material that flashes when the solvent or material is mixed with the viscous liquid from the transfer zone to be readily removed to vapor outlet 20.

Figure 2:
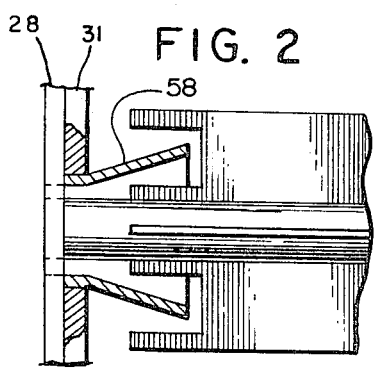
FIGS. 2, 3, 4 and 5 are enlarged fragmentary views of various embodiments of my invention.

FIG. 2 shows a further alternative embodiment of my invention wherein a sleeve 58 is conical and diverges outwardly from the orifice plate 31.

Figure 3:
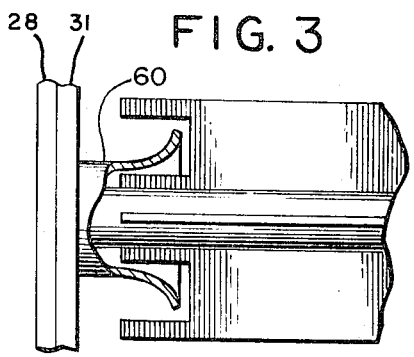

FIG. 3 shows an alternative embodiment of my invention wherein the end of a sleeve 60 is flared.

Figure 4:
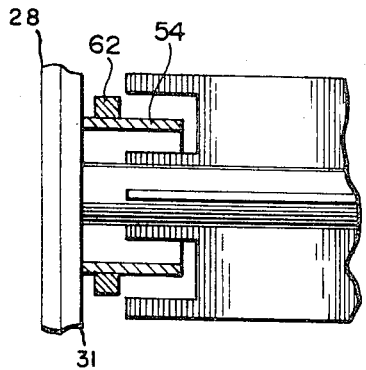

FIG. 4 shows the sleeve 54 with a ring 62 placed just before the ends of the rotor blades 46.

Figure 5:
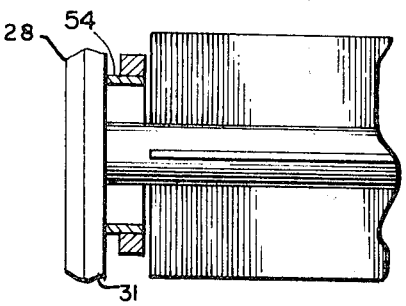

FIG. 5 shows another embodiment wherein the sleeve 54 extends up to, but not touching the edges of blades 46.

It is readily apparent that the five embodiments described and shown are generally equivalent and further they are merely illustrative and may be incorporated into any type of single or multi-zone thin-film evaporation unit particularly horizontally axised tapered thin-film evaporators such as shown in U.S. Patent No. 3,253,643. In a tapered unit when the blades cast the material on the chamber wall a vector component is imparted to the material back toward the feed end because of the sloping wall (reverse taper) thereby increasing the amount of liquid material to strike the wall and then flow on the sleeve. Also, other types of design will be obvious to those skilled in the art to prevent the feed material from falling off the end of the sleeve into the vapor stream.

My apparatus and method may be employed with a variety of polymeric and non-polymeric materials, but is particularly applicable where a material to be concentrated in the evaporator zone increases in viscosity on concentration. Typical materials to be processed would include monomers and polymers like polyesters, copolymers, polyamides, polyamines, polycarbonates, etc., esters and the like. For example, a water-soluble resin or polymer prepared in a hydrocarbon or organic solvent may have the organic solvent removed in the evaporating zone, the viscous concentrated polymer transferred to the feed zone, and water added to form a water-resin solution or emulsion. The material to be tested may be admixed with water, organic solvents, like hydrocarbons, ketones, alcohols, esters and the like, while these liquids or others may be added to the concentrated resin in the feed zone or other treatment with gas, liquids, catalyst, etc., carried out.

What I claim is:

1. An evaporating apparatus of the substantially horizontally axised rotary wiped thin-film type which apparatus comprises in combination:
    (a) a processing section characterized by an interior wall defining a surface of revolution and heat exchange means about said wall;
    (b) a rotor shaft within the chamber;
    (c) means to rotate the rotor shaft;
    (d) rotor blades directly secured to and extending from the rotor shaft for rotation therewith, the blades generally, radially and coaxially arranged from the rotor shaft along its length and extending into a close relationship with the interior wall of the chamber, the rotor blades being characterized by cutout segments in the upstream end thereof;
    (e) an inlet in the upstream end of the chamber for the introduction of material to be processed;
    (f) an outlet spaced axially apart and downstream from the inlet in the chamber for the removal of processed material;
    (g) a vapor chamber adjacent to and immediately upstream of the processing section and the inlet; and
    (h) a fixed plate at the upstream end of the processing section transverse to the rotor axis having an axial flow passage therein sealing the process section against liquid flow therefrom and for the flow of the vapor stream from the processing section to the vapor chamber, a generally cylindrical sleeve secured about the axial flow passage of the plate and extending from the plate toward the outlet, and into the cutout sections of the rotor blades in a non-contacting manner, means extending circumferentially about and radially outward from the free end surface of the sleeve to inhibit the flow of entrained liquid material off of the sleeve and into the vapor stream.

2. The apparatus of claim 1 wherein the means extending about the sleeve includes a ring secured to the sleeve.

3. The apparatus of claim 1 wherein the radially extending means comprises a flange at the downstream end thereof.

4. The apparatus of claim 1 which includes a second thin-film processing section located downstream of the first processing section, a transfer zone intermediate said first and second processing sections, an inlet in the second zone for the introduction of feed material into said zone, said processed material removal outlet lying in said second zone at the downstream end thereof.

5. The apparatus of claim 4 wherein said transfer means includes a tapered drum secured to the rotor shaft for rotation therewith, the drum being adjacent to adjacent ends of the rotor blades of the first and second zones and having a helical flight on the surface thereof adapted to move material discharged from the first zone to the second zone, a small diameter of the drum being adjacent the first zone and the flight extending from the drum surface into a close relationship with the interior wall of the chamber whereby material from the first zone forms a seal between the transfer zone and the second zone.

6. The apparatus of claim 4 wherein the radially extending means is a flange at the downstream end of the sleeve.

7. An evaporating apparatus of the substantially horizontally axised rotary wiped thin-film type which apparatus comprises in combination:
    (a) a processing section characterized by an interior wall defining a surface of revolution and heat exchange means about said wall;
    (b) a rotor shaft within the chamber;
    (c) means to rotate the rotor shaft;

(d) rotor blades directly secured to and extending from the rotor shaft for rotation therewith, the blades generally, radially and coaxially arranged from the rotor shaft along its length and extending into a close relationship with the interior wall of the chamber, the rotor blades being characterized by cutout segments in the upstream ends thereof;

(e) an inlet in the upstream end of the chamber for the introduction of material to be processed;

(f) an outlet spaced axially apart and downstream from the inlet in the chamber for the removal of processed material;

(g) a vapor chamber adjacent to and immediately upstream of the processing section and the inlet; and (h) a fixed plate at the upstream end of the processing section transverse to the rotor axis sealing the process section against liquid flow therefrom and having an axial flow passage therein for the flow of the vapor stream from the processing section to the vapor chamber, a generally conical sleeve secured about the axial flow passage of the plate and diverging outwardly from the plate to the outlet and into the cutout sections of the rotor blades in a non-contacting manner, to inhibit the flow of entrained liquid material off of the sleeve and into the vapor stream.

8. An evaporating apparatus of the substantially horizontally axised rotor wiped thin-film type which apparatus comprises in combination:

(a) a processing section characterized by an interior wall defining a surface of revolution and heat exchange means about said wall;

(b) a rotor shaft within the chamber;

(c) means to rotate the rotor shaft;

(d) rotor blades directly secured to and extending from the rotor shaft for rotation therewith, the blades generally, radially and coaxially arranged from the rotor shaft along its length and extending into a close relationship with the interior wall of the chamber;

(e) an inlet in the upstream end of the chamber for the introduction of material to be processed;

(f) an outlet spaced axially apart and downstream from the inlet in the chamber for the removal of processed material;

(g) a vapor chamber adjacent to and immediately upstream of the processing section and the inlet; and (h) a fixed plate at the upstream end of the processing chamber transverse to the rotor axis and having an axial flow passage therein sealing the process section against liquid flow therefrom into the vapor chamber and for the flow of the vapor stream from the processing section to the vapor chamber, a generally cylindrical sleeve secured about the axial flow passage of the plate and extending toward the outlet, means extending circumferentially about and radially outward from the surface of the sleeve, the peripheral edge of said means being radially less than the peripheral edge of the rotor blades to inhibit the flow of entrained liquid material off of the sleeve and into the vapor stream.

References Cited

UNITED STATES PATENTS

| 3,234,993 | 2/1966 | Belcher | 159—6 |
| 3,253,643 | 5/1966 | Budheim | 159—6 |

NORMAN YUDKOFF, *Primary Examiner.*

J. SOFER, *Assistant Examiner.*

U.S. Cl. X.R.

159—13; 202—236